US011185164B1

(12) United States Patent
Schwind

(10) Patent No.: US 11,185,164 B1
(45) Date of Patent: Nov. 30, 2021

(54) ROTATING PAINTING APPARATUS

(71) Applicant: John Schwind, Berlin, NH (US)

(72) Inventor: John Schwind, Berlin, NH (US)

( * ) Notice: Subject to any disclaimer, the term of this patent is extended or adjusted under 35 U.S.C. 154(b) by 0 days.

(21) Appl. No.: 17/323,077

(22) Filed: May 18, 2021

Related U.S. Application Data

(63) Continuation-in-part of application No. 16/996,318, filed on Aug. 18, 2020, now Pat. No. 11,019,927.

(51) Int. Cl.
| | |
|---|---|
| *A47B 97/04* | (2006.01) |
| *F16M 13/02* | (2006.01) |
| *B44D 3/18* | (2006.01) |
| *A47G 1/16* | (2006.01) |
| *F16H 7/06* | (2006.01) |
| *A47B 97/00* | (2006.01) |
| *F16H 7/08* | (2006.01) |

(52) U.S. Cl.
CPC ............... *A47B 97/04* (2013.01); *B44D 3/185* (2013.01); *F16H 7/06* (2013.01); *F16M 13/022* (2013.01); *A47B 97/001* (2013.01); *A47G 1/166* (2013.01); *F16H 2007/087* (2013.01)

(58) Field of Classification Search
CPC ........ A47B 7/04; A47B 97/001; B44D 3/185; F16H 7/06; F16H 2007/087; F16M 13/022; A47G 1/166; A47G 1/1686
See application file for complete search history.

(56) References Cited

U.S. PATENT DOCUMENTS

| | | | | |
|---|---|---|---|---|
| 9,033,300 | B1 * | 5/2015 | Logan | B44D 7/00 248/451 |
| 11,019,927 | B1 * | 6/2021 | Schwind | B44D 3/185 |
| 2003/0080272 | A1 * | 5/2003 | Toghanian | A47B 97/04 248/448 |
| 2014/0144083 | A1 * | 5/2014 | Artwohl | G09F 23/065 49/70 |
| 2014/0326846 | A1 * | 11/2014 | Selwa | A47B 97/04 248/448 |
| 2015/0321116 | A1 * | 11/2015 | Hoffend, III | G01L 5/107 248/542 |
| 2017/0099948 | A1 * | 4/2017 | Prasad | A47B 97/001 |
| 2018/0116430 | A1 * | 5/2018 | Peake | A47G 1/166 |
| 2021/0106137 | A1 * | 4/2021 | Norman | A47B 97/08 |

* cited by examiner

*Primary Examiner* — Tan Le
(74) *Attorney, Agent, or Firm* — Dale J. Ream

(57) ABSTRACT

A rotating painting apparatus includes a plurality of painting stations rotatably mounted to a base plate and each station having 2, 3, 4, or more faces on which to apply paint. A painting station includes a drive shaft rotatably coupled to the base plate. Rotation of the drive shaft causes the painting station to swivel, i.e., to rotate. The stretched frame member includes upstanding side support members extending from the bottom wall and about which a length of canvas may be stretched to form a painting station having two faces (front and rear), three faces (triangular), or four faces (cube), and so on. A chain drive operated by a drive motor enables all of the frame assemblies to be rotated together. The apparatus may include a motion sensor operable to actuate the motor and drive shaft to cause rotation when motion is detected.

19 Claims, 11 Drawing Sheets

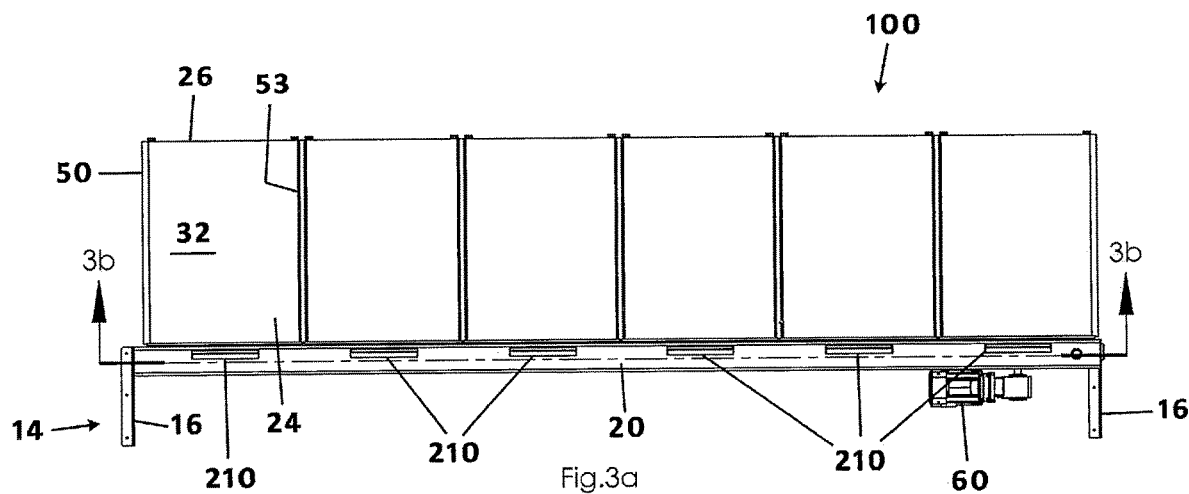
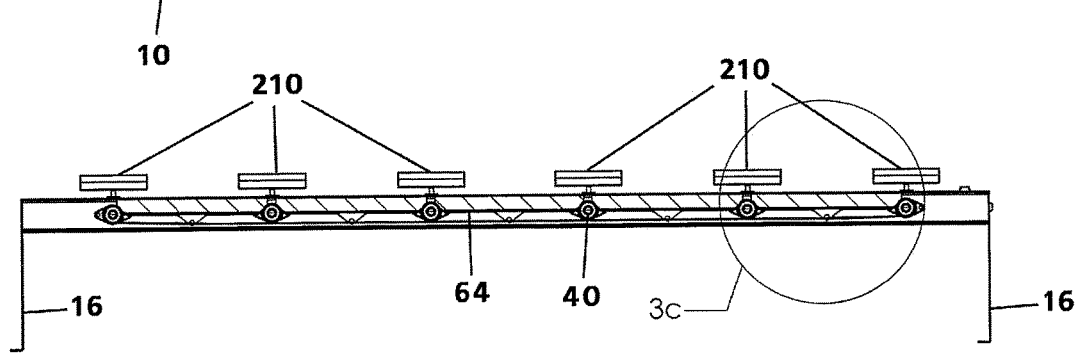
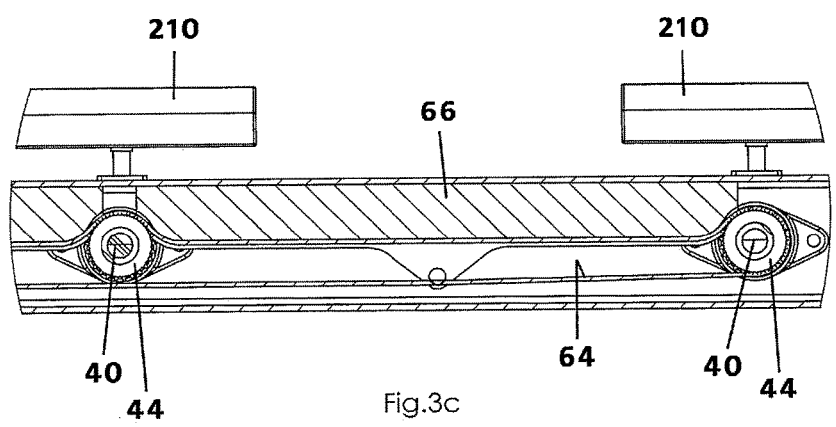

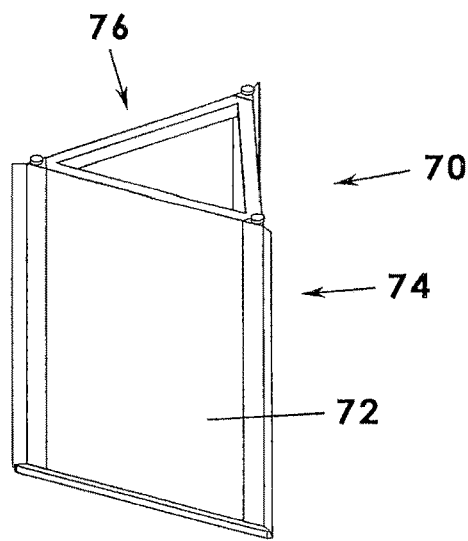
Fig.8a
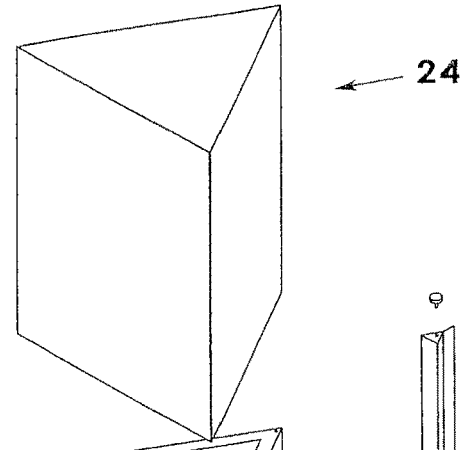
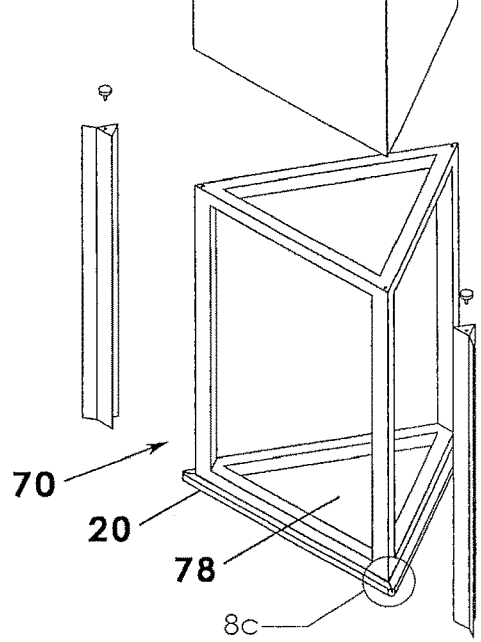
Fig.8b
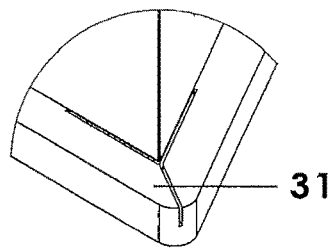
Fig.8c

ROTATING PAINTING APPARATUS

REFERENCE TO RELATED APPLICATIONS

This application is a continuation in part of application U.S. Ser. No. 16/996,318 filed Aug. 18, 2020, titled rotating painting apparatus.

BACKGROUND OF THE INVENTION

This invention relates generally to painting devices and, more particularly, to a painting apparatus in which one canvas may be painted upon and then rotated and stowed away while another canvas is automatically positioned for receiving paint. The rotating painting apparatus may include two, three, or four canvas faces and a plurality of painting stations may be rotated simultaneously via a motorized chain device.

Traditionally, an artist may apply paint to a canvas positioned on an easel. Then, when complete or if the artist chooses to work on another painting, the original canvas must be removed from the easel and a new canvas installed and made ready for painting. The process of removing and replacing a canvas can be very time consuming and inconvenient, especially when considering an art studio in which multiple canvases are being painted at one time and may, potentially, all need to be removed, stored, and replaced multiple times over days or weeks of instruction.

Therefore, it would be desirable to have a rotatable painting apparatus that enables an artist to rotate a painting to a stowed position and work on another painting without having to change out one canvas for another. Further, it would be desirable to have a rotatable painting apparatus that separates canvas portions with a shield member so that paint does not bleed from one painting area to an adjacent painting area. In addition, it would be desirable to have a rotatable painting apparatus having a plurality of painting stations that are linked together by a motorized chain drive and operable to rotate simultaneously. In addition, it would be desirable to have a rotatable painting apparatus that may be actuated to rotate when motion remote from the painting apparatus is detected.

SUMMARY OF THE INVENTION

A rotating painting apparatus according to the present invention includes a base plate and a predetermined number of painting stations rotatably mounted to the base plate and each painting stations having 2, 3, 4, or more faces on which to apply paint. Specifically, a "quad-fold" design may include a plurality of painting stations (referred to as stretcher frame assemblies) and each assembly may present four faces, i.e. four canvases, that may be painted on and then rotated out of the way to reveal another canvas to paint on, and so on. The rotating painting apparatus may be actuated to rotate when. Motion remote from the painting apparatus is detected.

The base plate, which may be mounted to a wall, includes opposing ends and a linear configuration. A painting station, aka a stretched frame member, includes a bottom wall from which a drive shaft depends and about which the bottom wall is rotatably coupled to the base plate. Rotation of the drive shaft causes the painting station to swivel, i.e. to rotate. The stretched frame member includes a number of side support members extending from the rotating painting apparatus bottom wall and about which a length of canvas may be stretched to form a painting station having two faces (front and rear), three faces (triangular), or four faces (cube), and so on. The rotating painting apparatus may include a plurality of frame assemblies that are adjacent to yet separated from one another. A chain drive operated by a drive motor enables all of the frame assemblies to be rotated together. A motion sensor may be operably connected or in data communication with the chain drive for actuation thereby when motion is detected adjacent yet remote from the painting apparatus.

Therefore, a general object of this invention to provide a rotatable painting apparatus that enables an artist to rotate a painting to a stowed position and work on another painting without having to change out one canvas for another.

Another object of this invention is to provide a rotatable painting apparatus, as aforesaid, that separates canvas portions with a shield member so that paint does not bleed from one painting area to an adjacent painting area.

Still another object of this invention is to provide a rotatable painting apparatus, as aforesaid, having a plurality of painting stations that are linked together by a motorized chain drive and operable to rotate simultaneously.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3a is a front view of the rotatable painting apparatus as in FIG. 2b;

FIG. 3b is a sectional view taken along line 3b-3b of FIG. 3a;

FIG. 3c is an isolated view on an enlarged scale taken from FIG. 3b;

FIG. 4b is a sectional view taken along line 4b-4b of FIG. 4a;

FIG. 5b is an isolated view on an enlarged scale taken from FIG. 5a;

FIG. 6b is an isolated view on an enlarged scale taken from FIG. 6a;

FIG. 6c is an exploded view of the stretcher frame member as in FIG. 6a;

FIG. 8a is a perspective view of a single triangular stretcher frame assembly taken from the rotatable painting apparatus of FIG. 7;

FIG. 8b is an exploded view of the stretcher frame assembly as in FIG. 8a;

FIG. 8c is an isolated view on an enlarged scale taken from FIG. 8b;

FIG. 10b is an exploded view of the stretcher frame assembly as in FIG. 10a;

DESCRIPTION OF THE PREFERRED EMBODIMENT

Figure 1A:
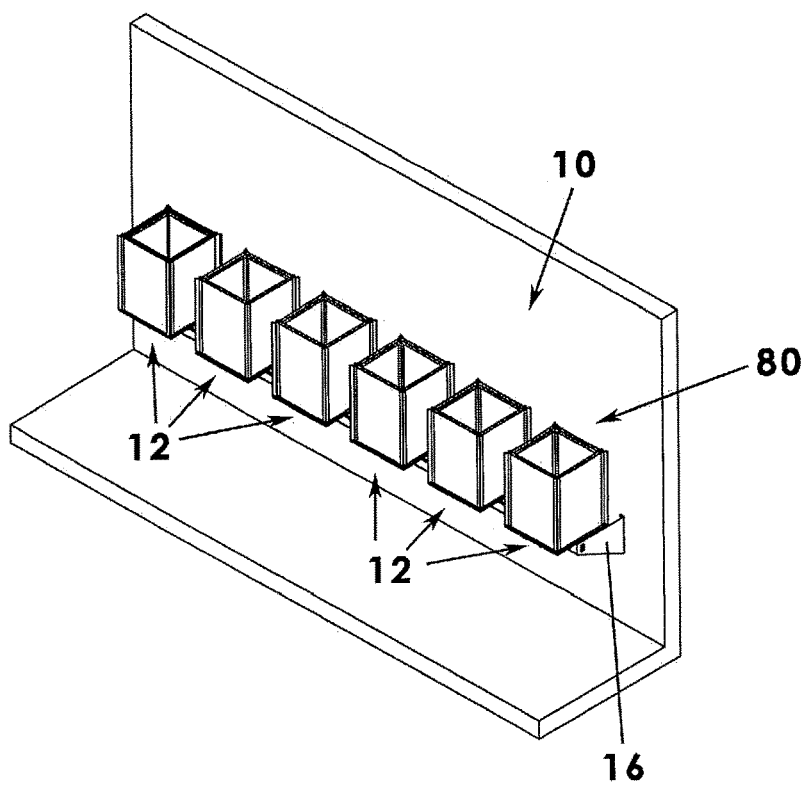
FIG. 1a is a perspective view of a rotatable painting apparatus according to a quad-fold embodiment of the present invention, illustrated mounted to a wall in a horizontal configuration.
Figure 1B:
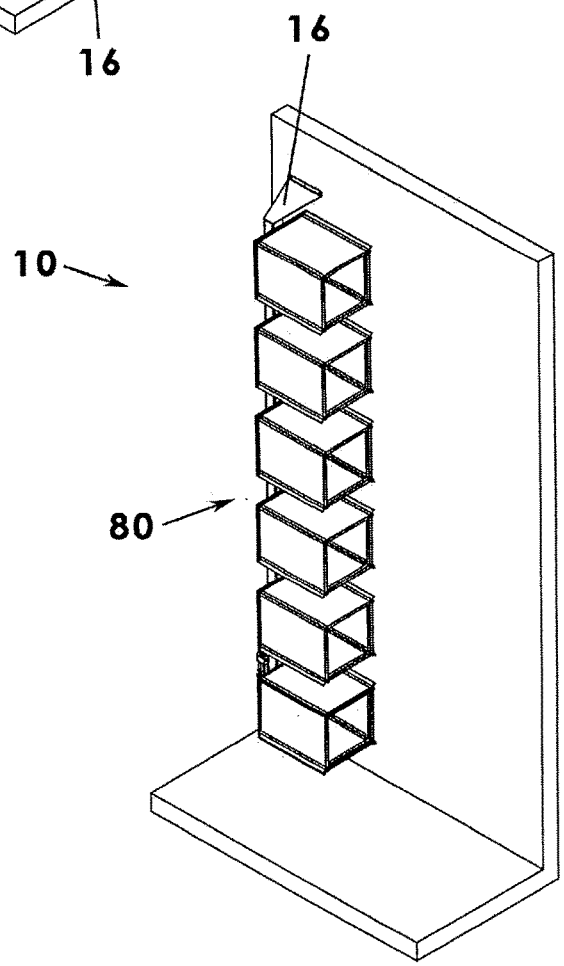
FIG. 1b is a perspective view of a rotatable painting apparatus according to a quad-fold embodiment of the present invention, illustrated mounted to a wall in a vertical configuration.

A rotating painting apparatus according to a preferred embodiment of the present invention will now be described with reference to FIGS. 1a to 11 of the accompanying drawings. The rotating painting apparatus 10 includes a base plate 20, at least one stretcher frame member 30 (aka a painting station), about which an elongate canvas 24 may be stretched and applied.

All of the embodiments of the rotating painting apparatus 10 include a base plate 20 to which at least one painting station 12 is rotatably coupled. Preferably, the base plate 20 includes a first end 21 and a second end 22 opposite the first end 21 and has a generally elongate and linear configuration although other shape configurations may also be possible. For sake of clarity, the base plate 20 defines a longitudinal axis. The base plate 20 includes a top surface that may define a channel 31 or groove along its longitudinal axis and that is configured to receive a lower end of a paint shield member as will be discussed later.

Figure 6A:
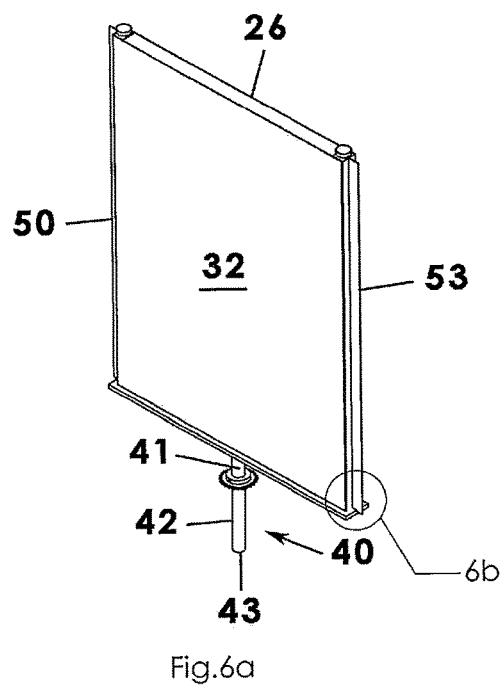
FIG. 6a is a perspective view of a stretcher frame member removed from FIG. 2a for clarity.
Figure 6C:
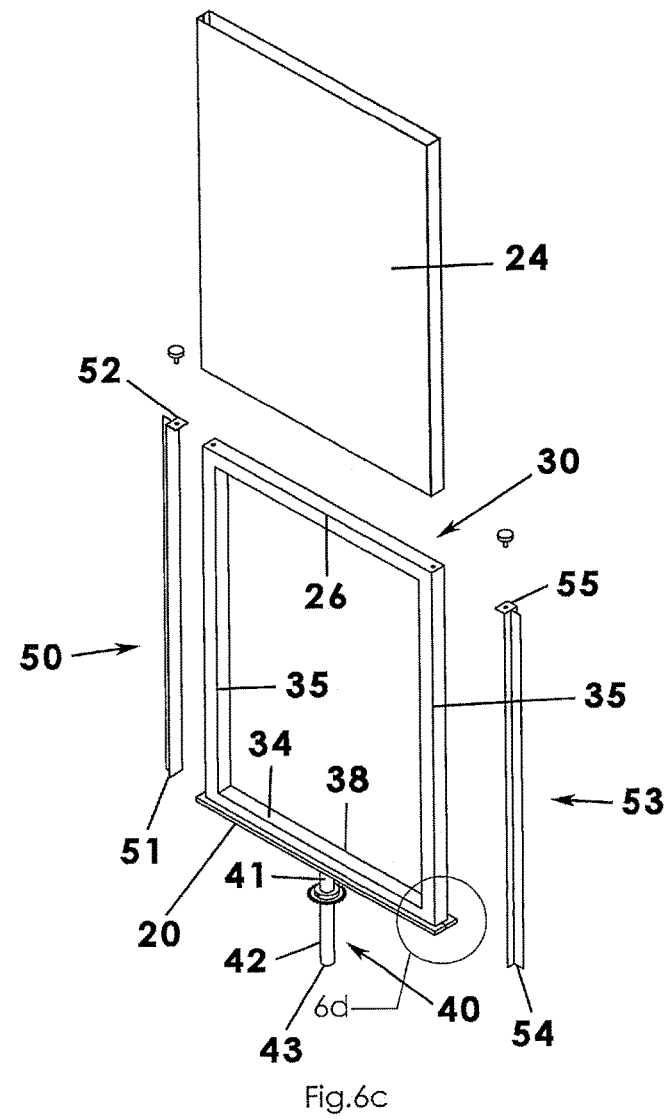
Figure 6B:
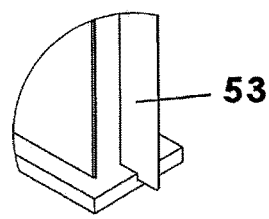
Figure 6D:
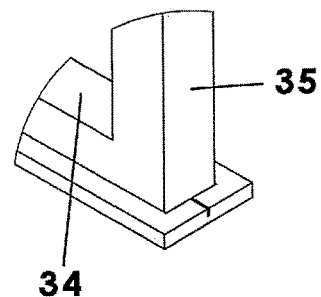
FIG. 6d is an isolated view on an enlarged scale taken from FIG. 6c.
Figure 7:
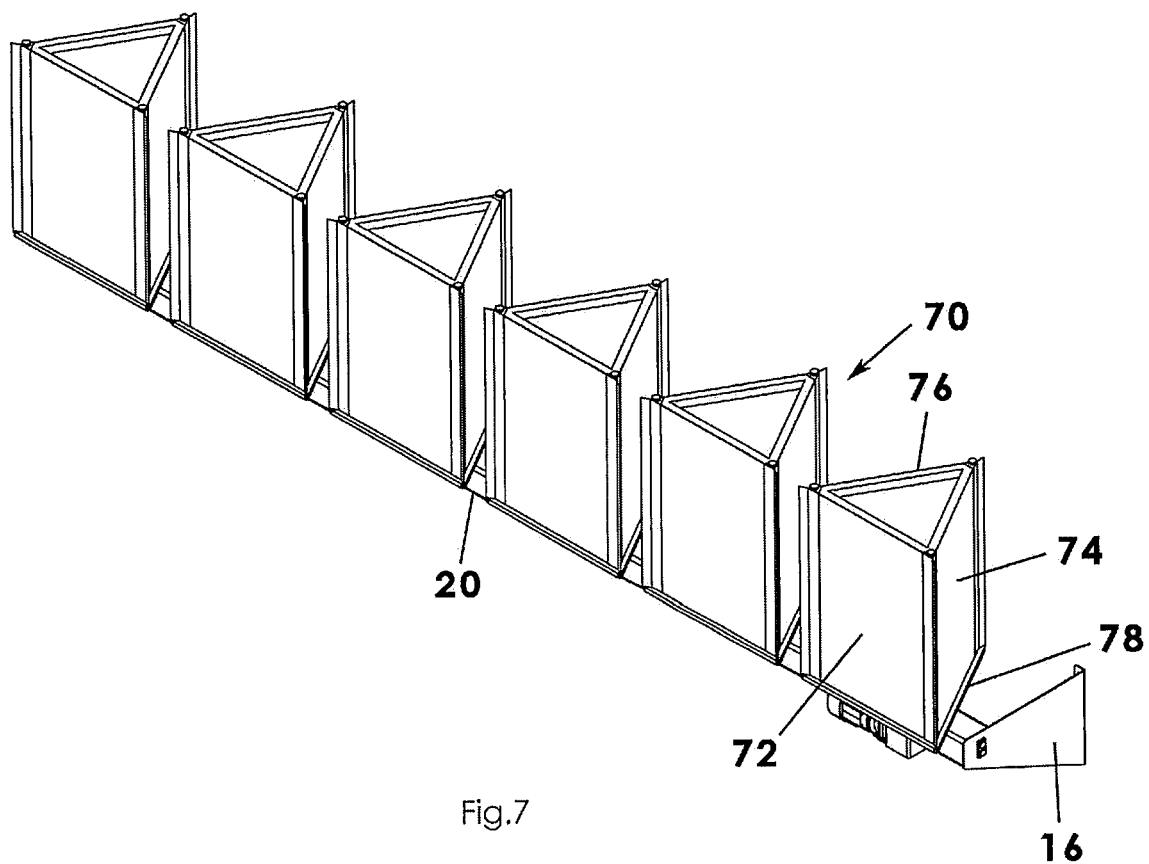
FIG. 7 is a perspective view of a rotatable painting apparatus according to a tri-fold embodiment of the present invention.

The rotating painting apparatus 10 also includes at least one stretcher frame member 30 which forms the basis for a painting station 12 as will be described below. An embodiment having a single stretcher frame member 30 and defining front and back faces 32, 33 will be described initially. More particularly, the stretcher frame member 30 includes a pair of bottom ends 34 opposite one another and a pair of side support members 35 extending upwardly from the pair of bottom ends 34, respectively. In an embodiment, a top support member 36 may extend between upper ends of the side support members 35, respectively. A drive shaft 40 or similar rod includes a proximal end 41 coupled to a bottom surface of the bottom wall 38 and so that the drive shaft depends therefrom, e.g., extends away from the bottom wall 38. The drive shaft 40 has a body portion 42 that extends through the base plate 20 and, specifically, is rotatably coupled to the base plate 20, the drive shaft 40 also having a distal end 43 opposite the proximal end 41 (FIGS. 6a and 6b). Further, each drive shaft 40 may be coupled to an associated sprocket 44 for reasons that will become more apparent later when considering a plurality of stretcher frame members 100 being actuated simultaneously.

Figure 2A:
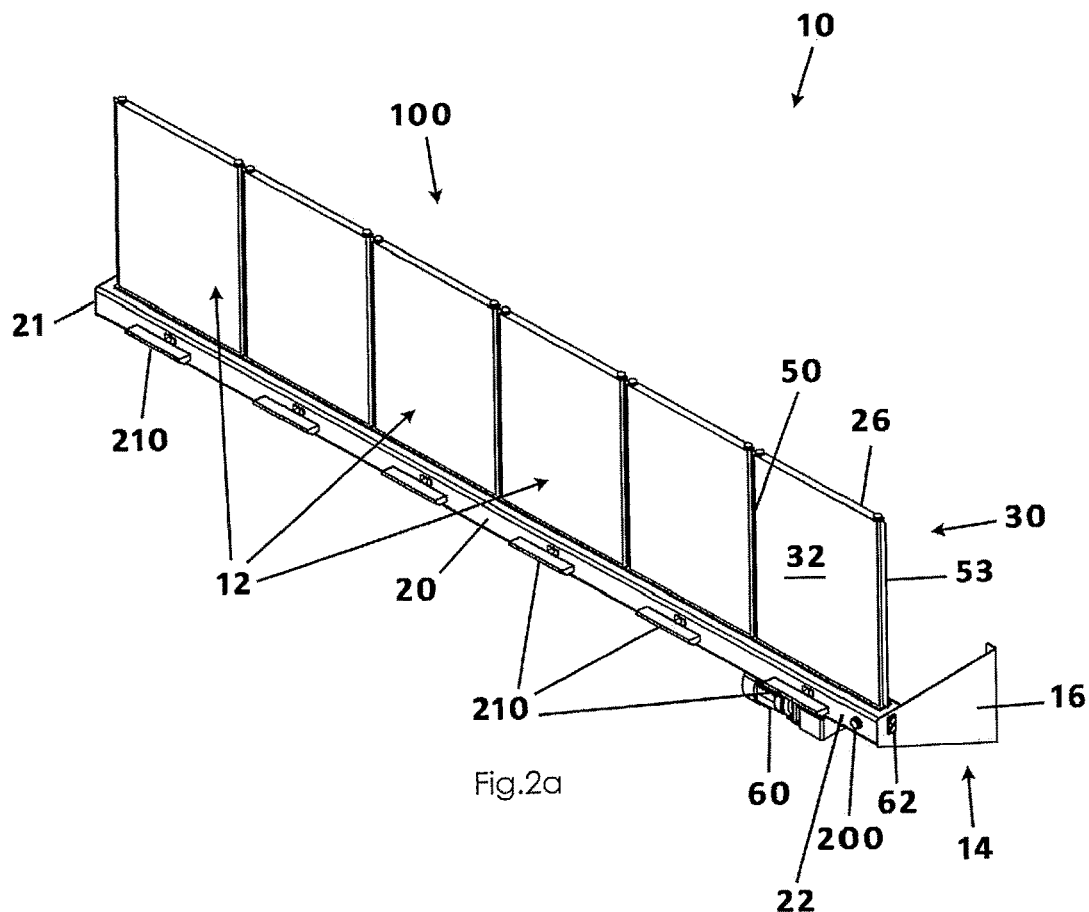
FIG. 2a is a perspective view of a rotatable painting apparatus according to a bi-fold embodiment of the present invention, illustrated in a stowed configuration.
Figure 2B:
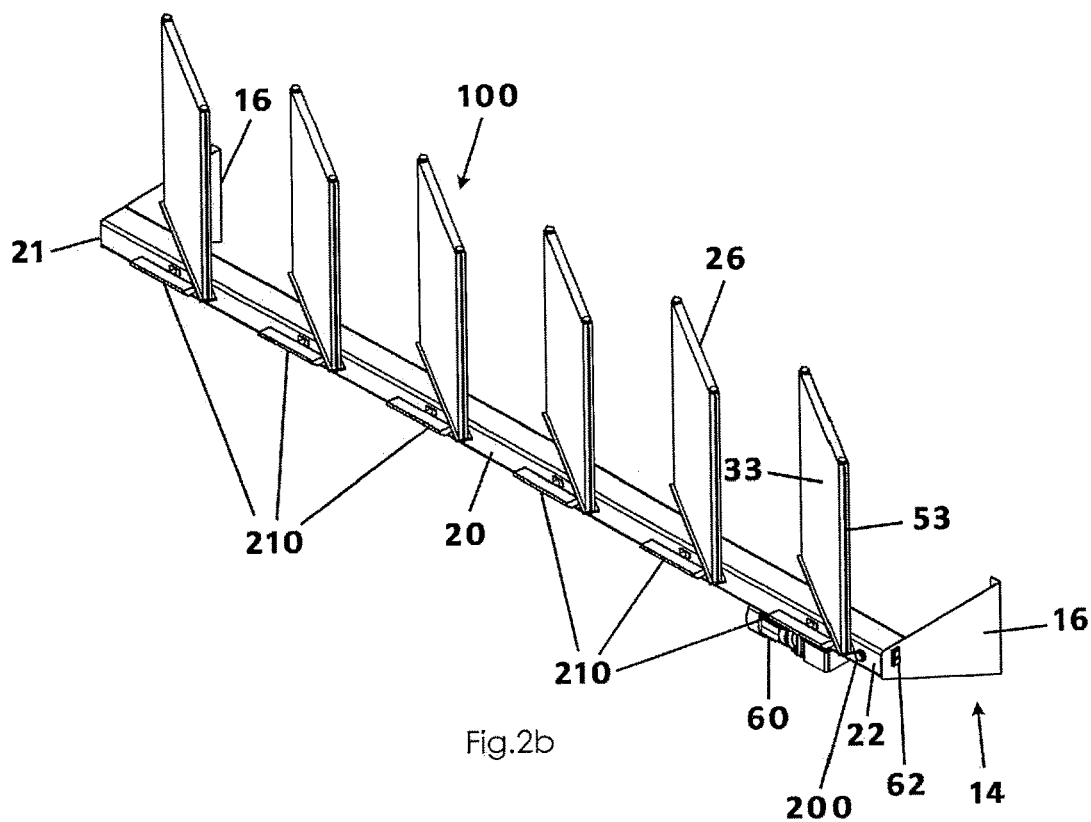
FIG. 2b is a perspective view of a rotatable painting apparatus according to a bi-fold embodiment of the present invention, illustrated in a swiveled configuration.
Figure 4A:
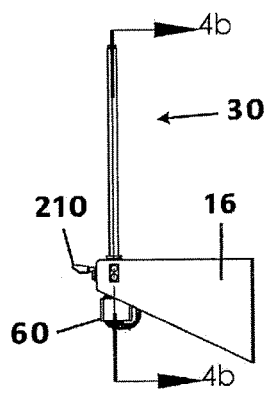
FIG. 4a is a side view of the rotatable painting apparatus as in FIG. 2b.
Figure 4B:
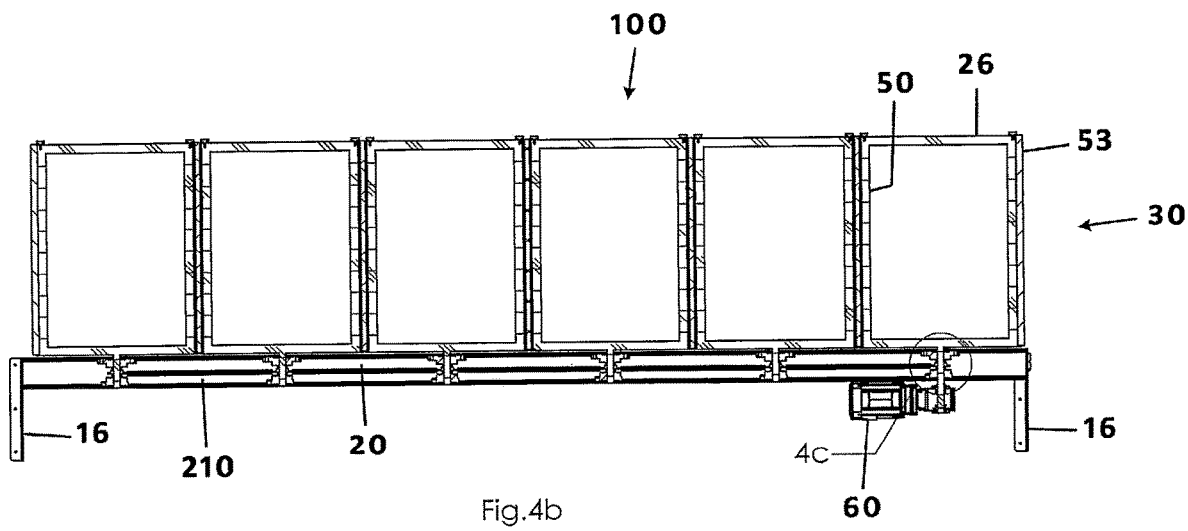
Figure 4C:
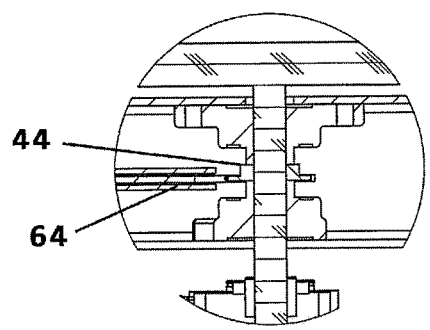
FIG. 4c is an isolated view on an enlarged scale taken from FIG. 4b.

It will be understood that the stretcher frame member 30 may be swiveled relative to the base plate 20 by rotation of the drive shaft 40 between a first position at which the bottom wall is coaxial with said longitudinal axis of the base plate 20 (FIG. 2a) and a second position at which the bottom wall is offset (angled) from the longitudinal axis of said base plate 20 (FIG. 2b). In other words, the stretcher frame member 30 may be swiveled between a use configuration at which paint may be applied and a stowed configuration at which one painting may be put aside and another canvas is positioned for use.

In another aspect, a canvas 24 may be stretched around respective side support members 35 of the stretcher frame member 30 so as to form a front face 32 and a rear face 33. Hence, the name "stretcher frame member." More particularly, the canvas 24 may be a large rectangular sheet that may be wrapped around the side support members 35 of the frame to present square or rectangular faces 32, 33 on which to apply paint. In the embodiment described above, the swivel or rotation may be 180 degrees, i.e. front to back or back to front.

Once the canvas 24 has been installed (i.e., wrapped about the side support members 35), the rotating painting apparatus 10 may include a pair of shield members that, when installed, stretch the canvas 24 tight and also prevent paint from bleeding from one face of the canvas 24 onto an adjacent face. More particularly, a left shield member 50 has a generally linear configuration and is releasably mounted to a left side support member of the pair of side support members. Similarly, a right shield member 53 has a generally linear configuration and is releasably mounted to a right side support member of the pair of side support members 35. In an embodiment, the left and right shield members 50, 53 may be coupled to respective side support members 35 in a friction fit engagement. Alternatively, the left and right shield members 50, 53 may be coupled to respective side support members 35 with fasteners. More particularly, the left shield member 50 may include upper and lower ends with the lower end thereof including a first left shield flange 51 configured to be received in the channel 31 defined by the base plate 20 (described above). Similarly, the right shield member 53 may include upper and lower ends with the lower end thereof including a first right shield flange 54 configured to be received in the channel 31 defined by the base plate 20. Further, the top support member 36 may define a pair of holes 37 and that may be threaded. Then, the upper end of the left shield member 50 may include a second left shield flange 52 configured to be releasably received in a left hole of the pair of holes 37 or to otherwise be coupled to the pair of side support members 35 of the stretcher frame member 30. Similarly, the right shield member 53 may include upper and lower ends with the upper end thereof including a second right shield flange 55 configured to be releasably received in a right hole of the pair of holes 37 or to otherwise be coupled to the pair of side support members 35 of the stretcher frame member 30.

In an embodiment, the stretcher frame member 30 may actually refer to a plurality of stretcher frame members 100 coupled to the base plate 20. Each respective stretcher frame member 30 includes a construction substantially similar to the construction described above. Each respective stretcher frame member 30 is adjacent to a next stretcher frame member 30 but, preferably, not touching or overlapping any adjacent stretcher frame member (FIG. 2a). Accordingly, the plurality of stretcher frame members 100 may swivel between use and storage configurations without conflict. With further detail, each respective stretcher frame member 30 includes a respective bottom wall 38 having the aforementioned bottom ends 34 from which respective side support members 35 may be coupled. Further each respective stretcher frame member 30 includes a respective drive shaft 40 depending and extending away from a bottom surface of the bottom wall and rotatably coupled to the base plate 20. Accordingly, each respective stretcher frame member 30 is swiveled relative to the base plate 20 when its associated drive shaft 40 is rotated. Each one of the plurality of stretcher frame members 100 is the foundation for a plurality of painting stations 12.

In another aspect, the plurality of stretcher frame members 100 may be operably linked or "ganged" together so that they may be collectively or simultaneously actuated to swivel between the first (use) configuration and second (stowed) configuration. More particularly, the rotating painting apparatus 10 may include a drive motor 60 positioned proximate the plurality of stretcher frame members 100 (FIG. 3a). One of ordinary skill in the art will understand that the drive motor 60 may be electrically connected to A/C power (e.g., a power source such as a wall socket) or battery power and may be energized via a motor actuation button 62 (e.g., an on/off switch). In addition, the rotating painting apparatus 10 may include a chain 64 having a continuous or looped configuration and which is electrically and operably coupled to the drive motor 60 and configured to move linearly in a loop when energized, such as around a chain guide 66 or guide track. Further, the chain 64 may be coupled to each respective drive shaft 40 or, more particularly, to the sprocket 44 associated with said each respective drive shaft 40 (FIG. 3c). Accordingly, when the chain 64 is actuated, such as when the motor 60 is energized, the plurality of drive shafts 40 will be collectively rotated which then causes the plurality of stretcher frame members 100 to swivel as described above.

Figure 5A:
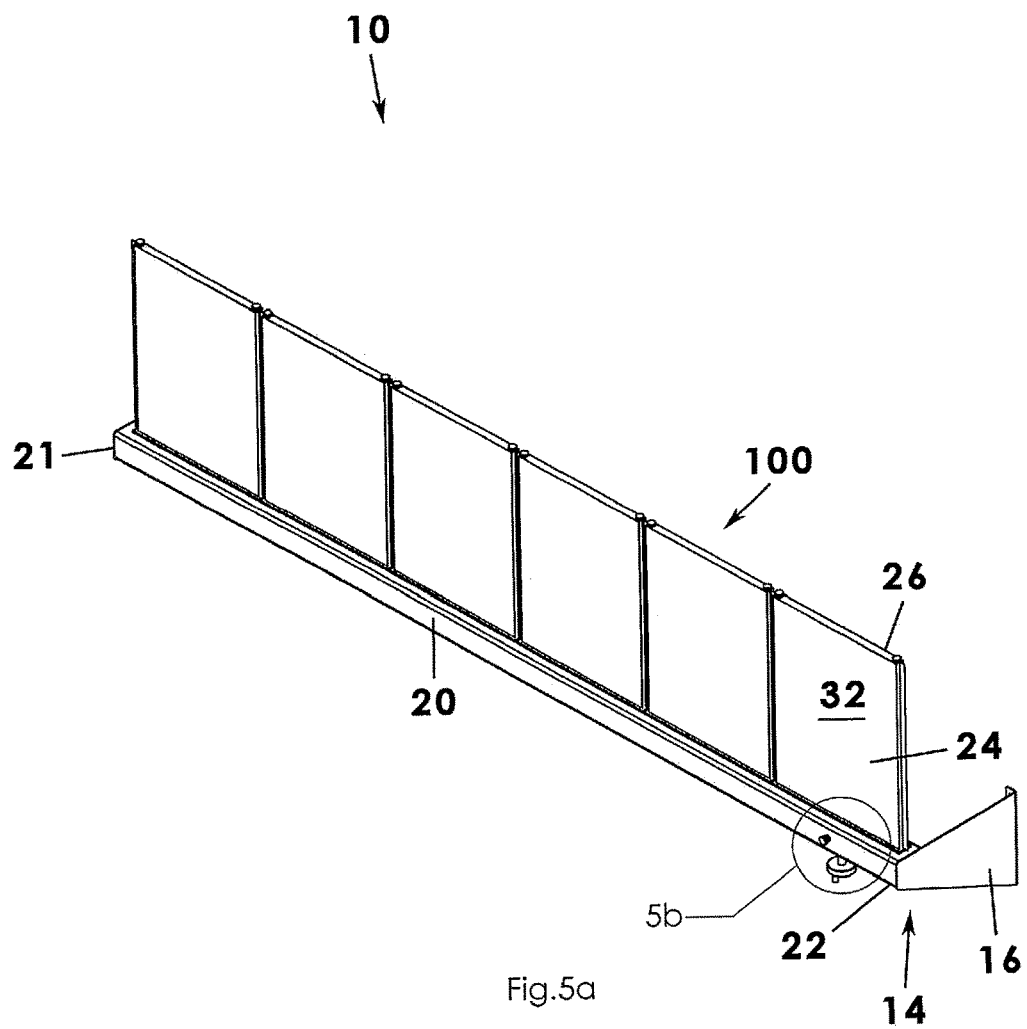
FIG. 5a is a perspective view of a rotatable painting apparatus according to a bi-fold embodiment of the present invention, modified to include a manual crank assembly.
Figure 5B:
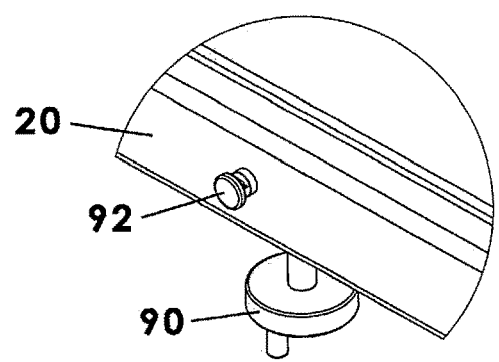

Alternately, the stretcher frame members 100, collectively, may be swiveled manually. More particularly, each drive shaft 40 may be connected together, such as with the chain 64 as described above. Instead of the drive motor 60, however, a rotary crank 90 may be mechanically connected to the chain 64 or directly to the drive shafts 40 through a mechanical linkage (FIG. 5b). Accordingly, when the rotary crank 90 is operated by a user, the plurality of stretcher frame members 100 are swiveled and rotated about the axis of respective drive shafts 40. In addition, the linkage may include a stop (not shown) that may be actuated by operation of rotation lock button 42 and, that is operable, when actuated to prevent the swivel movement described herein.

In an embodiment, the rotating painting apparatus 10 may include a motion sensor 200, also referred to as a motion detector, the motion sensor 200 being positioned on the base plate 20 and oriented to detect motion a remote distance in front of the apparatus 10. For context, a motion detector is an electrical device that utilizes a sensor to detect nearby motion. The motion sensor detects motion within a predetermined area. The motion sensor 200 may be electrically connected to the drive motor 60 or, in an embodiment, to the actuation button 62. In any case, the motion sensor 200 is "operably" connected to the drive shaft 40 (such as via the motor 60 being mechanically connected to the drive shaft 40. Accordingly, actuation of the motion sensor 200 may then result in actuation of the actuation button 62 and drive motor 60 and drive shaft 40, respectively and simultaneously. In use, therefore, a user may simply wave his hand generally in front of the motion sensor 200 rather than manipulating the actuation button 62 in order to energized the motor 62 swivel or rotate the plurality of stretcher frame members 100. Similarly, the motion sensor 200 may be actuated by a person walking in proximity to the motion sensor 200 and, as a result, resulting in rotation of the plurality of stretcher frame members 100.

In yet another aspect, the rotating painting apparatus 10 may include a wall mount assembly 14 having at least a pair of wall fasteners 16 coupled to the first end 21 and the second end 22 of the base plate 20, respectively. As shown, the wall fasteners 16 may be brackets of the like that extend between the base plate 20 and a wall of a house or the like.

In an embodiment, the rotating painting apparatus 10 may include a stretched frame member that includes not just a front face 32 and rear face 33 but, rather that includes a triangular configuration having a first face 72, second face 74, and third face 76. In still another embodiment, the stretched frame member has four faces arranged in a cube or cubed configuration. In fact, in these embodiments, the stretched frame member will be referred to as a stretched frame "assembly" 70 and 80, respectively.

With specific reference to FIG. 8, a triangular embodiment includes the triangular stretcher frame assembly 70 includes three stretcher member portions coupled to one another in a triangular configuration. More particularly, the triangular stretcher frame assembly 70 includes a common bottom wall having three corner points and three side support members extending upwardly from the three corner points, respectively. Respective shield members may also be included for securing and stretching a canvas. Channel 31 may be defined by a bottom wall or bottom support but otherwise is designated using the same numeral 31 indicating a channel. The channel may be configured to receive a lower end of each shield member in a mating engagement as described previously. Further, the common bottom wall 78 is rotatably coupled to the base plate via a drive shaft having a proximal end coupled to the common bottom wall 78 and a body portion extending through the base plate and away from the proximal end (not shown specifically but having the same structure and function as first described above). Also substantially similar to the construction described above, the triangular stretcher frame assembly 70 includes a canvas stretched about the three side support members of the stretcher frame assembly so as to define a first face 72, a second face 72, and a third face 74 arranged in a triangular configuration and each face being operable for receiving paint. In operation, the triangular stretcher frame assembly 70 is swiveled by rotation of the associated drive shaft between a first position at which the first face 72 is parallel to the base plate, a second position at which the second face 74 is parallel to the base plate, and a third position at which the third face 76 is parallel to the base plate 20. It is understood that the triangular stretcher frame assembly 70 described above may include a plurality triangular stretcher frame assemblies 70 situated adjacent one another and each coupled to the base plate 20 (FIG. 8). In the manner first described, all of the plurality of triangular stretcher frame assemblies may be actuated together as they are coupled to the chain and associated assembly.

Figure 9:
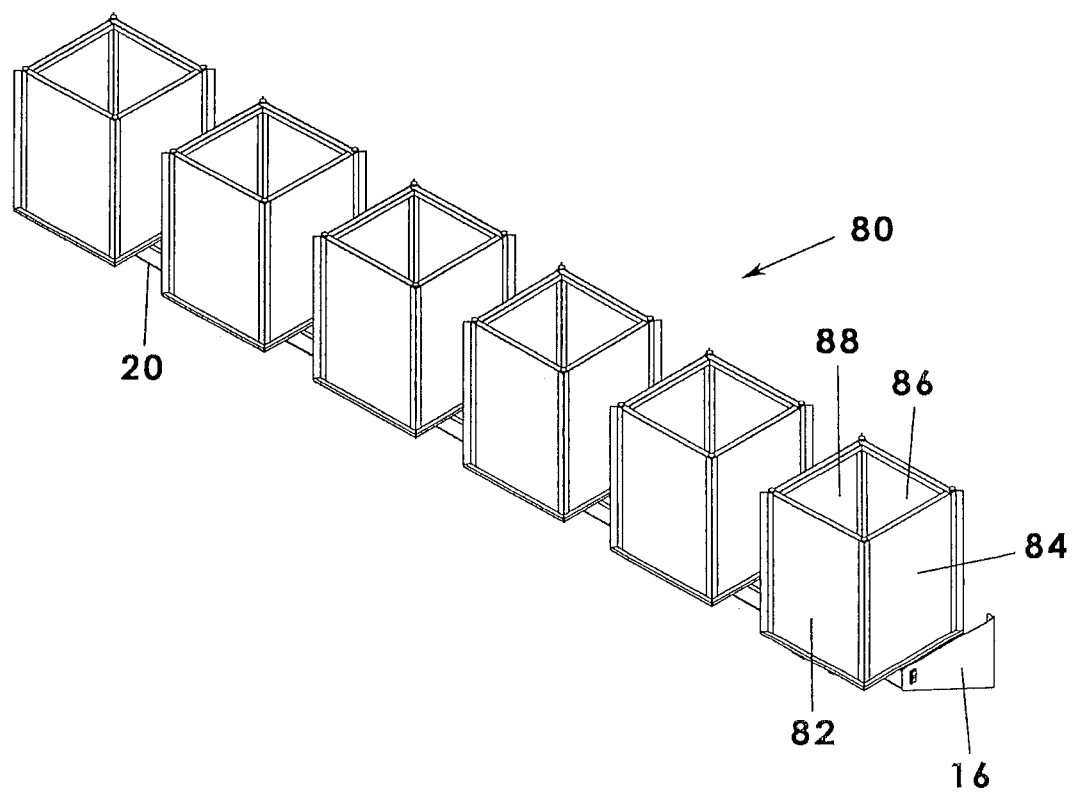
FIG. 9 is a perspective view of a rotatable painting apparatus according to a quad-fold embodiment of the present invention.
Figure 10A:
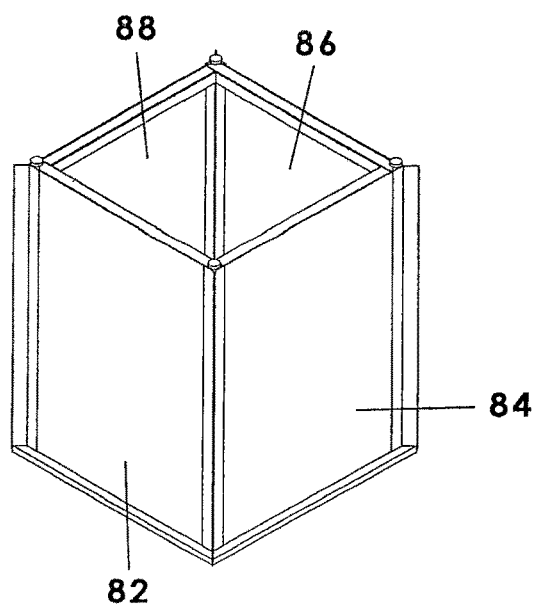
FIG. 10a is a perspective view of a single cube-shaped stretcher frame assembly taken from the rotatable painting apparatus of FIG. 9.
Figure 10B:
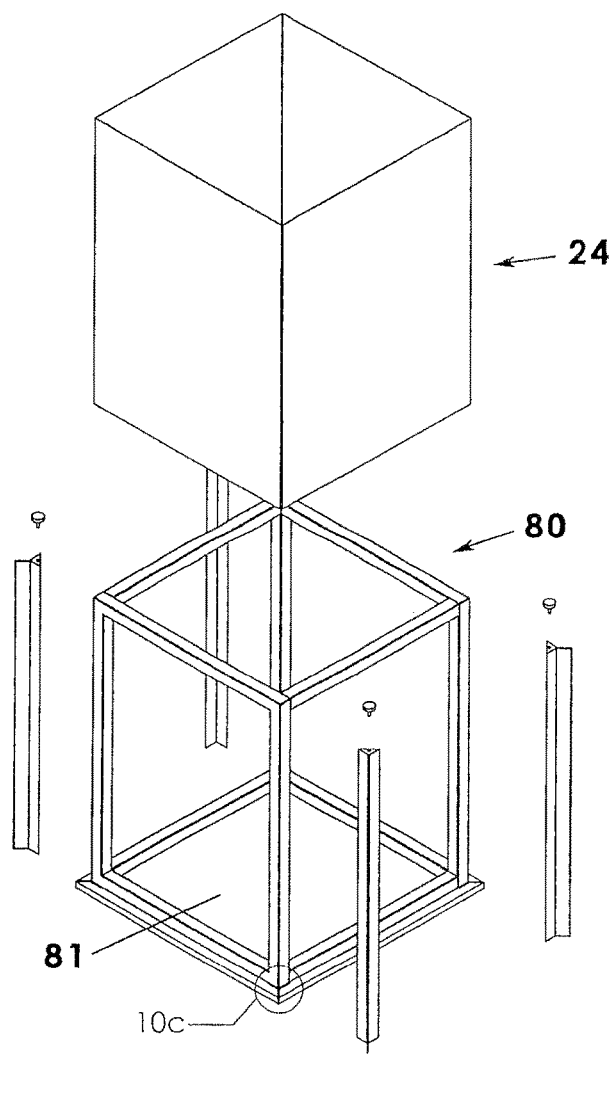
Figure 10C:
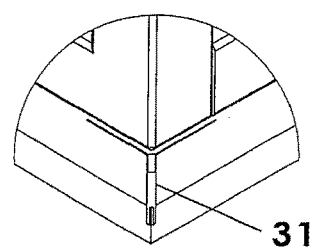
FIG. 10c is an isolated view on an enlarged scale taken from FIG. 10b.
Figure 11:
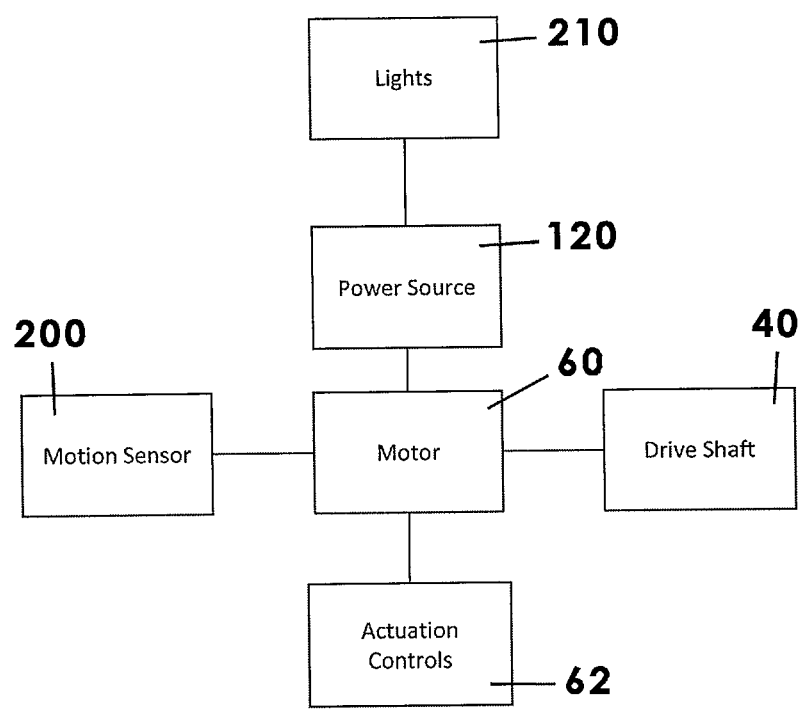
FIG. 11 is a block diagram of the electric components according to the present invention.

With reference to FIG. 9, a cube embodiment includes the cube-shaped stretcher frame assembly 80 having four stretcher member portions coupled to one another in a cube-shaped configuration. More particularly, the cube-shaped stretcher frame assembly 80 includes a common bottom wall 81 having four corner points and four side support members extending upwardly from the four corner points, respectively. Further, the common bottom wall 81 is rotatably coupled to the base plate 20 via a drive shaft having a proximal end coupled to the common bottom wall and a body portion extending through said base plate 20 and away from the proximal end (not shown specifically but having the same structure and function as first described above). Also substantially similar to the construction described above, the cube-shaped stretcher frame assembly 80 includes a canvas stretched about said four side support members of the cube-shaped stretcher frame assembly 80 so as to define a first face 82, a second face 82, a third face 84, and a fourth face 86 arranged in a cube-shaped configuration and each face being operable for receiving paint. In operation, the cube-shaped stretcher frame assembly 80 is swiveled by rotation of the associated drive shaft between a first position at which the first face 82 is parallel to the base plate, a second position at which the second face 84 is parallel to the base plate 20, a third position at which the third 86 is parallel to the base plate 20, and a fourth position at which the fourth face 88 is parallel to the base plate 20. It is understood that the cube-shaped stretcher frame assembly 80 described above may include a plurality of cube-shaped stretcher frame assemblies situated adjacent one another and each coupled to the base plate 20 (FIG. 9). In the manner first described, all of the plurality of cube-shaped stretcher frame assemblies may be actuated together as they are coupled to the chain and associated assembly.

In use, a painter, such as an artist or even a plurality of art students, may position himself in front of a painting station 12, i.e., positioned at a stretcher frame member or stretcher frame assembly. Paint may be applied to the canvas 24 as desired. Then, when the artist desires to put a current painting away and work on another painting, the drive motor 60 may be actuated to swivel or rotate the stretcher frame member 30 as described above. Notably, the canvas 24 on which the current painting is applied does not need to be removed and replaced—but simply rotated to a storage position and a next painting is immediately positioned for use. As described above, the rotatable painting apparatus may be singular, triangular, or cubical in configuration. And, as described above, the stretcher frame members 30 may be actuated to rotate when the motion sensor 200 detects motion remote from the rotating painting apparatus 10, such as by a person walking by.

It is understood that while certain forms of this invention have been illustrated and described, it is not limited thereto except insofar as such limitations are included in the following claims and allowable functional equivalents thereof.

The invention claimed is:

1. A rotating painting apparatus, comprising
a base plate having a first end and a second end opposite said first end and having an elongate linear configuration, said base plate defining a longitudinal axis;
a stretcher frame member having a bottom wall that includes a pair of bottom ends and a pair of side support members extending upwardly from said pair of bottom ends, respectively, said bottom wall being rotatably coupled to said base plate via a drive shaft having a proximal end coupled to said bottom wall and a body portion extending through said base plate and away from said proximal end,
wherein said stretcher frame member is swiveled by rotation of said drive shaft between a first position at which said bottom wall is coaxial with said longitudinal axis of said base plate and a second position at which said bottom wall is offset from said longitudinal axis of said base plate;

a canvas stretched about said pair of side support members of said stretcher frame so as to define a front face and a rear face operable for receiving paint;
a left shield member having a linear configuration and releasably mounted to a left one of said pair of side support members;
a right shield member having a linear configuration and releasably mounted to a right one of said pair of side support members;
a motion sensor coupled to said base plate and electrically connected to a power source, said motion sensor being operably coupled to said drive shaft such that said drive shaft is rotated from said first position to said second position when said motion sensor detects movement.

2. The rotating painting apparatus as in claim 1, further comprising a drive motor electrically connected to said power source, said motion sensor, and said drive shaft for moving said drive shaft from said first position to said second position when said drive motor is energized.

3. The rotating painting apparatus as in claim 2, wherein:
said base plate defines a channel extending longitudinally between said first end and said second end;
said left shield member includes a lower end having a first left shield flange that is selectively received in said channel; and
said left shield member includes an upper end having a second left shield flange that is releasably coupled to said left one of said pair of side support members of said stretcher frame member.

4. The rotating painting apparatus as in claim 3, wherein:
said right shield member includes a lower end having a first right shield flange that is selectively received in said channel; and
said right shield member includes an upper end having a second right shield flange that is releasably coupled to said right one of said pair of side support members of said stretcher frame member.

5. The rotating painting apparatus as in claim 1, wherein said stretcher frame member includes a plurality of stretcher frame members, each respective stretcher frame member being rotatably mounted along said base plate and separated from any adjacent stretcher frame member.

6. The rotating painting apparatus as in claim 5, wherein said each respective stretcher frame member comprises:
a respective bottom wall that includes a respective pair of bottom ends and a respective pair of side support members extending upwardly from said respective pair of bottom ends, respectively, said respective bottom wall being rotatably coupled to said base plate via a respective drive shaft having a proximal end coupled to said respective bottom wall and a respective body portion extending through said base plate and away from said proximal end,
wherein said each respective stretcher frame member is swiveled along said base plate by rotation of said respective drive shaft between a first position at which said respective bottom wall is coaxial with said longitudinal axis of said base plate and a second position at which said respective bottom wall is offset from said longitudinal axis of said base plate; and
a respective canvas that is stretched about said respective pair of side support members of said stretcher frame so as to define a front face and a rear face operable for receiving paint.

7. The rotating painting apparatus as in claim 6, further comprising:
- a drive motor positioned proximate said plurality of stretcher frame members; and
- a chain electrically connected to said drive motor and operably coupled to each respective drive shaft such that linear operation of said chain along a circuitous path causes rotation of said each respective drive shaft and swivel movement of said plurality of stretcher frame members, respectively, relative to said base plate.

8. The rotating painting apparatus as in claim 7, further comprising an actuator control button electrically connected to said drive motor by which said drive motor is selectively actuated.

9. The rotating painting apparatus as in claim 7, further comprising:
- a plurality of drive sprockets operably coupled to said each respective drive shaft associated with said plurality of stretcher frame members, respectively,
- wherein said chain is coupled to said plurality of drive sprockets such that said each respective drive shaft is rotated when said chain is actuated.

10. The rotating painting apparatus as in claim 5, further comprising a wall mount assembly having a pair of wall fasteners coupled to said first end and said second end, of said base plate, respectively, said pair of wall fasteners being operable to mount said plurality of stretcher frame members to a wall.

11. The rotating painting apparatus as in claim 1, wherein:
- said stretcher member is a stretcher frame assembly that includes three stretcher member portions coupled to one another in a triangular configuration, said stretcher frame assembly having a bottom wall that includes three corner points and three side support members extending upwardly from said three corner points, respectively, said bottom wall being rotatably coupled to said base plate via a drive shaft having a proximal end coupled to said bottom wall and a body portion extending through said base plate and away from said proximal end,
- said stretcher frame assembly includes a canvas stretched about said three side support members of said stretcher frame assembly so as to define a first face, a second face, and a third face arranged in a triangular configuration and operable for receiving paint;
- said stretcher frame assembly is swiveled by rotation of said drive shaft between a first position at which said first face is parallel to said base plate, a second position at which said second face is parallel to said base plate, and a third position at which said third face is parallel to said base plate.

12. The rotating painting apparatus as in claim 1, wherein:
- said stretcher member includes a stretcher frame assembly having four stretcher member portions coupled to one another in a cube configuration, said stretcher frame assembly having a bottom wall that includes four corner points and four side support members extending upwardly from said four corner points, respectively, said bottom wall being rotatably coupled to said base plate via a drive shaft having a proximal end coupled to said bottom wall and a body portion extending through said base plate and away from said proximal end,
- said stretcher frame assembly includes a canvas stretched about said four side support members of said stretcher frame assembly so as to define a first face, a second face, a third face, and a fourth face arranged in a cube configuration and operable for receiving paint;
- said stretcher frame assembly is swiveled by rotation of said drive shaft between a first position at which said first face is parallel to said base plate, a second position at which said second face is parallel to said base plate, a third position at which said third face is parallel to said base plate, and a fourth position at which said fourth face is parallel to said base plate.

13. The rotating painting apparatus as in claim 11, wherein said stretcher frame assembly includes a plurality of stretcher frame assemblies, each respective stretcher frame assembly being rotatably mounted along said base plate and separated from any adjacent stretcher frame assembly.

14. The rotating painting apparatus as in claim 13, wherein said each stretcher frame assembly comprises:
- a respective bottom wall that includes at least three corner points and at least three side support members extending upwardly from said at least three corner points, respectively, said respective bottom wall being rotatably coupled to said base plate via a respective drive shaft having a proximal end coupled to said respective bottom wall and a respective body portion extending through said base plate and away from said proximal end,
- wherein said each respective stretcher frame assembly is swiveled along said base plate by rotation of said respective drive shaft between a first position at which said first face is parallel to said base plate, a second position at which said second face is parallel to said base plate, and a third position at which said third face is parallel to said base plate; and
- a respective canvas that is stretched about said at least three side support members of said stretcher frame so as to define a first face, a second face, and a third face arranged in a triangular configuration and operable for receiving paint.

15. The rotating painting apparatus as in claim 14, further comprising:
- a drive motor positioned proximate said plurality of stretcher frame assemblies; and
- a chain electrically connected to said drive motor and operably coupled to each respective drive shaft such that linear operation of said chain along a circuitous path causes rotation of said each respective drive shaft and swivel movement of said plurality of stretcher frame assemblies, respectively, relative to said base plate.

16. A rotating painting apparatus, comprising
- a base plate having a first end and a second end opposite said first end and having an elongate linear configuration, said base plate defining a longitudinal axis;
- said stretcher frame assembly having a bottom wall that includes four corner points and four side support members extending upwardly from said four corner points, respectively, said bottom wall being rotatably coupled to said base plate via a drive shaft having a proximal end coupled to said bottom wall and a body portion extending through said base plate and away from said proximal end,
- said stretcher frame assembly includes a canvas stretched about said four side support members of said stretcher frame assembly so as to define a first face, a second face, a third face, and a fourth face arranged in a cube configuration and operable for receiving paint;

wherein said stretcher frame member is swiveled by rotation of said drive shaft between a first position at which said first face is parallel to said base plate, a second position at which said second face is parallel to said base plate, a third position at which said third face is parallel to said base plate, and a fourth position at which said fourth face is parallel to said base plate;

wherein said stretcher frame assembly includes a plurality of stretcher frame assemblies, each respective stretcher frame assembly having a respective drive shaft rotatably mounted to said base plate and being separated from an adjacent stretcher frame assembly;

a drive motor positioned proximate said plurality of stretcher frame assemblies and electrically connected to a power source; and a motion sensor coupled to said base plate and electrically connected to said power source and to said drive motor, said motion sensor being operably coupled to said drive shaft such that said drive shaft is rotated from said first position to said second position when said motion sensor detects movement and is energized.

17. The rotating painting apparatus as in claim 16, further comprising:
   a chain electrically connected to said drive motor and operably coupled to each respective drive shaft such that linear operation of said chain along a circuitous path causes rotation of said each respective drive shaft and swivel movement of said plurality of stretcher frame assemblies, respectively, relative to said base plate.

18. The rotating painting apparatus as in claim 17, further comprising:
   a plurality of drive sprockets operably coupled to said each respective drive shaft associated with said plurality of stretcher frame members, respectively,
   wherein said chain is coupled to said plurality of drive sprockets such that said each respective drive shaft is rotated when said chain is actuated.

19. The rotating painting apparatus as in claim 18, further comprising a wall mount apparatus having a pair of wall fasteners coupled to said first end and said second end of said base plate, respectively, said pair of wall fasteners being operable to mount said plurality of stretcher frame members to a wall.

* * * * *